(12) United States Patent
Murray

(10) Patent No.: US 11,495,929 B1
(45) Date of Patent: Nov. 8, 2022

(54) BATTERY PACK ADAPTER FOR POWER TOOLS

(71) Applicant: Neil Scott Murray, Souris (CA)

(72) Inventor: Neil Scott Murray, Souris (CA)

( * ) Notice: Subject to any disclaimer, the term of this patent is extended or adjusted under 35 U.S.C. 154(b) by 117 days.

(21) Appl. No.: 17/177,745

(22) Filed: Feb. 17, 2021

(51) Int. Cl.
| | | |
|---|---|---|
| *H01R 31/06* | (2006.01) | |
| *H01R 13/627* | (2006.01) | |
| *H01M 50/267* | (2021.01) | |
| *H01M 50/247* | (2021.01) | |
| *B25F 5/00* | (2006.01) | |

(52) U.S. Cl.
CPC ............... *H01R 31/06* (2013.01); *B25F 5/00* (2013.01); *H01M 50/247* (2021.01); *H01M 50/267* (2021.01); *H01R 13/6273* (2013.01); *H01M 2220/30* (2013.01)

(58) Field of Classification Search
CPC . H01R 31/06; H01R 13/6273; H01M 50/247; H01M 50/267

USPC .......................................................... 439/300
See application file for complete search history.

(56) References Cited

U.S. PATENT DOCUMENTS 6,525,511 B2    2/2003  Kubale
9,871,370 B2    1/2018  Friedman

*Primary Examiner* — Alexander Gilman
(74) *Attorney, Agent, or Firm* — Sanchelima & Associates, P.A.; Christian Sanchelima; Jesus Sanchelima

(57) ABSTRACT

A battery pack adapter system includes a device that allows different sized and shaped battery packs to be converted for use with multiple power tools from different brands. In one embodiment, a drill battery and drill are joined together through means of the battery pack adapter device. This allows the drill battery to power the drill even though the battery and drill have different configurations. The battery pack adapter device includes metal electrical connectors that extend from a top end of the device towards a bottom end of the device. The metal electrical connectors transfer the electrical energy from the battery to the power tool through by means of the adapter.

10 Claims, 5 Drawing Sheets

BATTERY PACK ADAPTER FOR POWER TOOLS

BACKGROUND OF THE INVENTION

1. Field of the Invention

The present invention relates to a battery pack adapter and, more particularly, to a battery pack adapter that allows different sized and shaped battery packs to be converted for use with multiple power tools.

2. Description of the Related Art

Several designs for a battery pack adapter have been designed in the past. None of them, however, include a battery pack adapter system including a device that allows different sized and shaped battery packs to be converted for use with multiple power tools from different brands. In one embodiment, a drill battery and drill are joined together through means of the battery pack adapter device. This allows the drill battery to power the drill even though the battery and drill have different configurations. The battery pack adapter device includes metal electrical connectors that extend from a top end of the device towards a bottom end of the device. The metal electrical connectors transfer the electrical energy from the battery to the power tool through by means of the adapter. It is known that there are a variety of twelve to twenty volt power tools available in the market today. These power tools often do not have matching battery attachments which leads to constant recharging of a battery and frustration from a user. Therefore, there is a need for a battery adapter to allow for the interchangeable use of batteries with several power tools Applicant believes that a related reference corresponds to U.S. Pat. No. 9,871,370 issued for a battery pack adapter for use with power tools that is used to attach a power source such as battery pack to a power tool. Applicant believes that another related reference corresponds to U.S. Pat. No. 6,525,511 issued for an adapter for a power tool battery that allows a batter with a slide connection to be used on a power tool with a tower style connection. However, the cited references differ from the present invention because they fail to disclose a universal battery adapter comprising a device that allows different sized and shaped battery packs to be converted for use with multiple power tools from different brands.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a battery pack adapter system which gives peace of mind and convenience to a user when operating power tools by allowing different types of batteries to be used with multiple types of power tools.

It is another object of this invention to provide a battery pack adapter system which eliminates the need to continuously recharge battery packs for power tools when not in use.

It is still another object of the present invention to provide a battery pack adapter system which provides a user with multiple choices of batteries for various twelve to twenty-volt tools.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
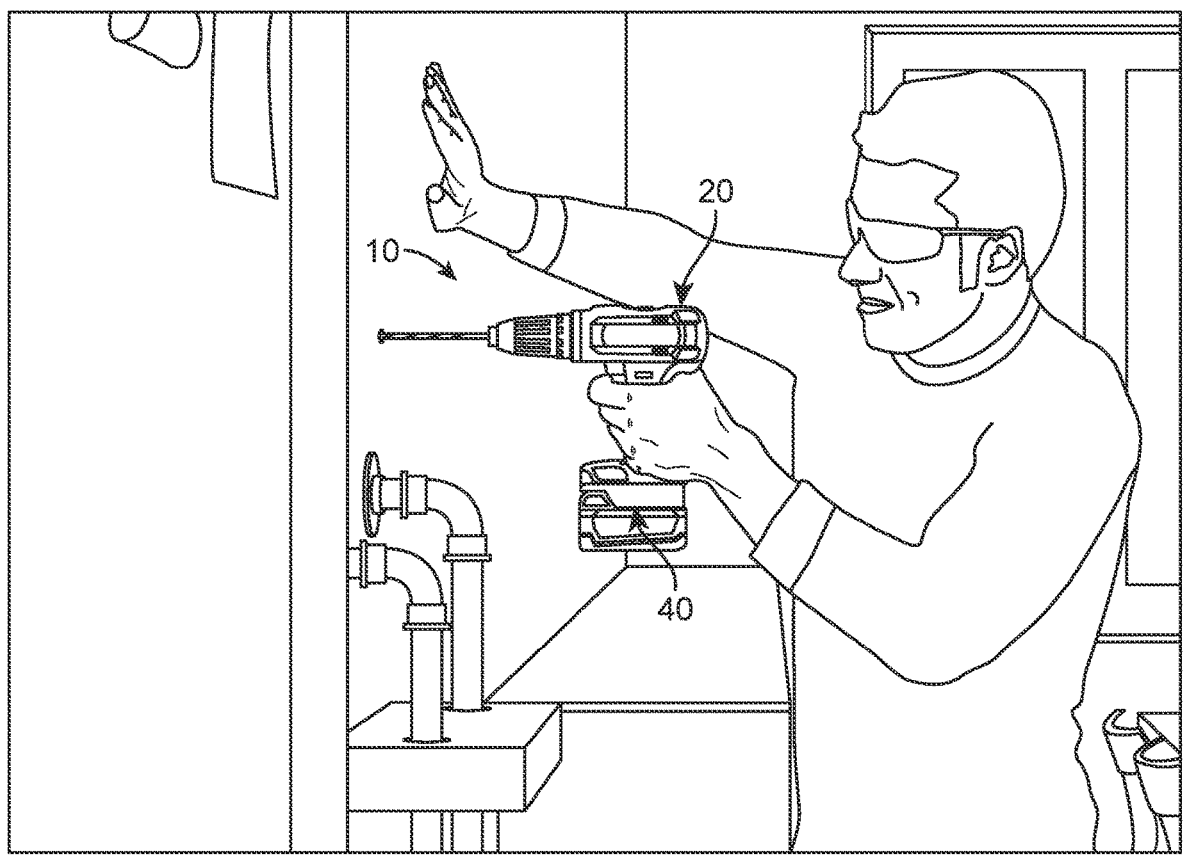
FIG. 1 represents an operational isometric view of battery pack adapter system 10 in accordance to an embodiment of the present invention.

Referring now to the drawings, where the present invention is generally referred to with numeral 10, it can be observed a battery pack adapter system 10 which basically includes a power tool assembly 20 and an adapter assembly 40.

Figure 2:
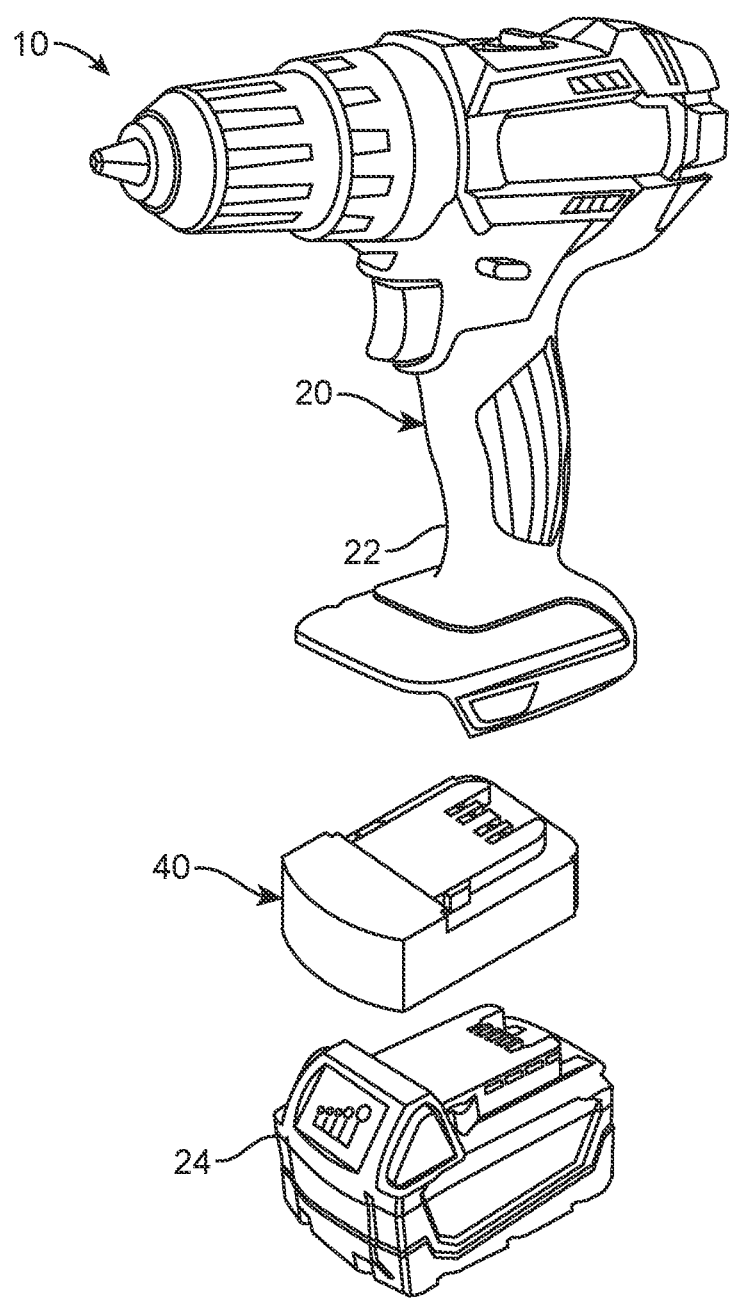
FIG. 2 shows an exploded isometric view of battery pack adapter system 10 including power tool assembly 20 and adapter assembly 40 in accordance to an embodiment of the present invention.
Figure 3:
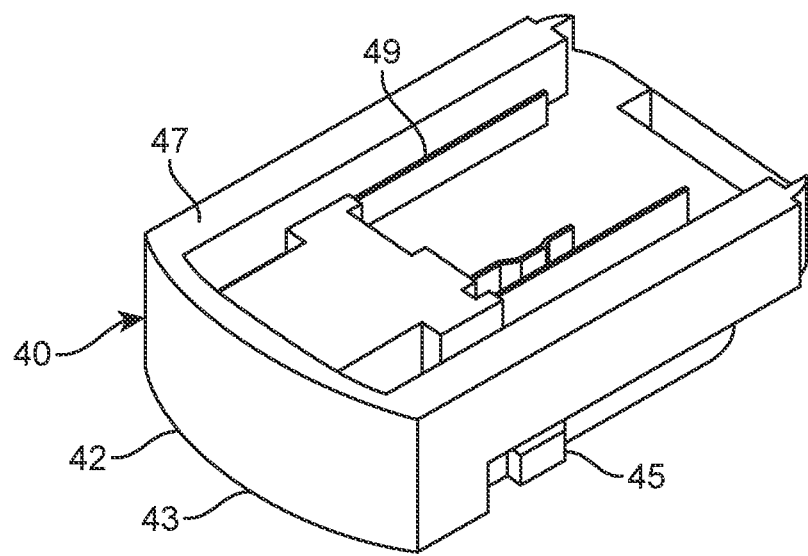
FIG. 3 an isometric view of adapter assembly 40 in accordance to an embodiment of the preset invention.

Power tool assembly 20 includes a power tool 22 and a battery 24 which may effectively be observed in FIG. 2 of the provided drawings. In one embodiment, power tool 22 may be provided as a drill as observed in the figures. However, other embodiments of the present invention may feature other varieties of power tools for the implementation of the battery pack adapter system 10. Additionally, power tool 22 may correspond to a power tool or drill that is provided from a variety of manufactures being sold under the trademark names, Dewalt, Black and Decker, Makita, or Milwaukee. It should be understood that any variety of 18-volt power drill, or any power tool which uses voltages between 12-20-volts may be used for the implementation of battery pack adapter system 10. Similarly, battery 24 may also be provided as an 12-20-volt battery which is provided from a variety of manufactures being sold on the same trademark names listed above for the power tool. As observed, battery 24 may include a flat base and have a rectangular configuration which cooperates with the bottom end of power tool 22.

Adapter assembly 40 includes an adapter 42 which is configured to be placed between power tool 22 and battery 24 as observed in FIG. 2 of the provided drawings. It should be understood, that FIG. 2 only shows one embodiment of the present invention and that adapter 42 may be configured to fit onto any form of power tool 22 or battery 24. In one embodiment, adapter 42 includes a top end 43 which may be observed in FIG. 4 of the provided drawings. The shape and height of top end 43 may vary depending on the variety of power tool 22 that is implemented in the system. Top end 43 has a shape which corresponds to a battery receiving portion of power tool 22. Further observed, top end 43 includes top electrical connections 44. Top electrical connections are provided as metal connection points which make an electrical contact with the battery receiving portion of power tool 22. This will allow for electrical power from the adapter 42 to be transferred through the adapter 42 and delivered to the power tool 22.

Figure 4:
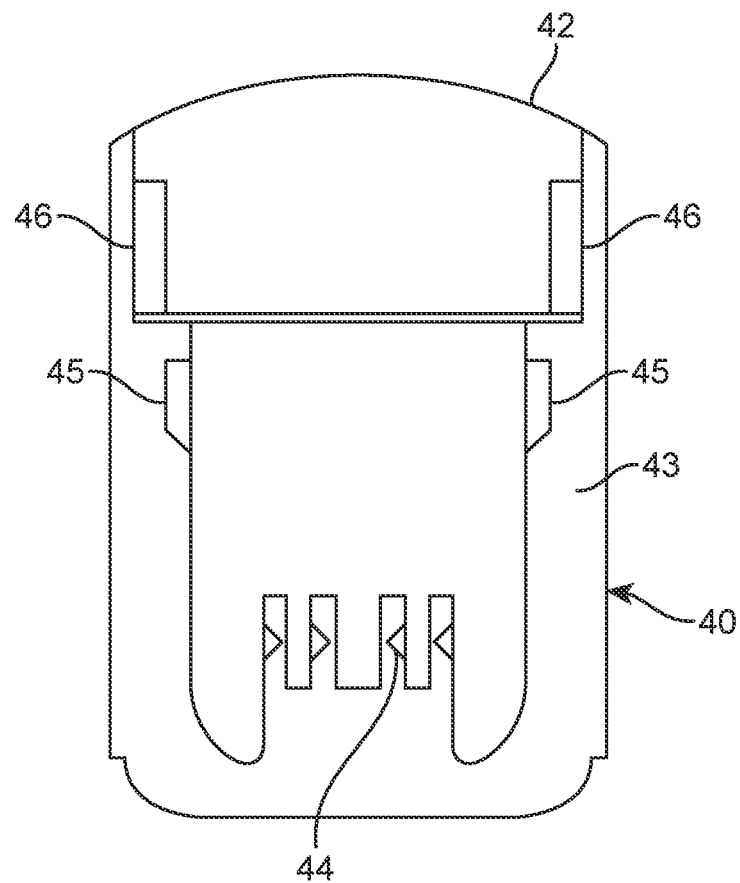
FIG. 4 is a representation of a top view of adapter assembly 40 in accordance to an embodiment of the present invention.

Top end 43 of adapter assembly 40 may further include latches 45 as observed in FIG. 4 in accordance to one embodiment of the present invention. In one embodiment, latches 45 are configured to form a secure connection within the battery receiving portion of power tool 22. Latches 45 may be provided as protruding structural members which protrude horizontally from a center portion of top end 43. It should be understood, the location of latches 45 may vary depending on the battery receiving portion that is provided for power tool 22. Top end 43 of adapter assembly 40 further includes buttons 46. In the present embodiment buttons 46 are a release buttons which are configured to disengage latches 45 and allows for adapter 42 to be released from the battery receiving portion of power tool 22. Additionally, buttons 46 may be located near a rear end of top end 43. However, the locations of buttons 46 may vary depending on the configuration of the battery receiving portion for power tool 22 that is implemented into the system 10.

Figure 5:
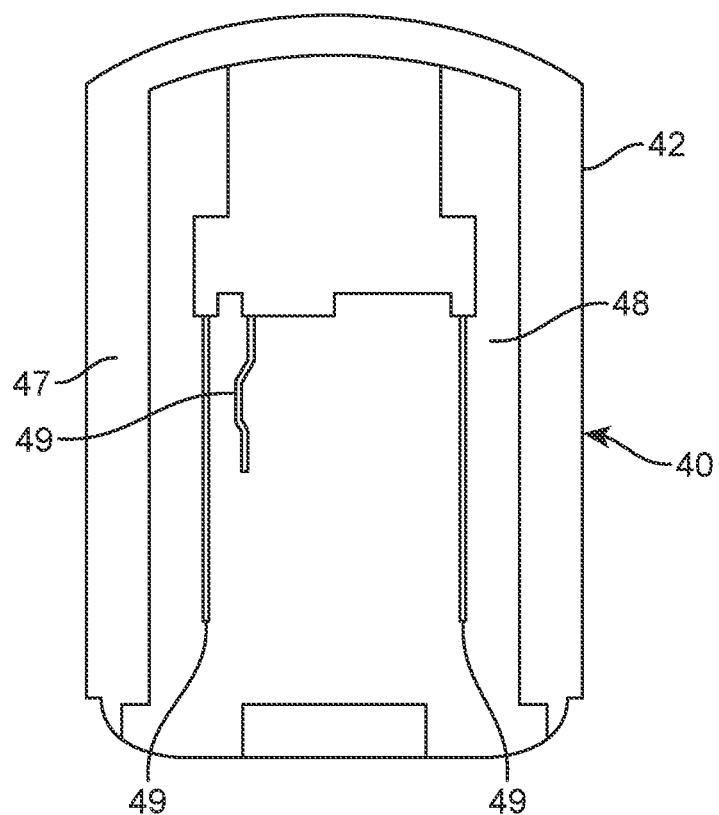
FIG. 5 shows a bottom view of adapter assembly 40 in accordance to an embodiment of the present invention.
Figure 6:
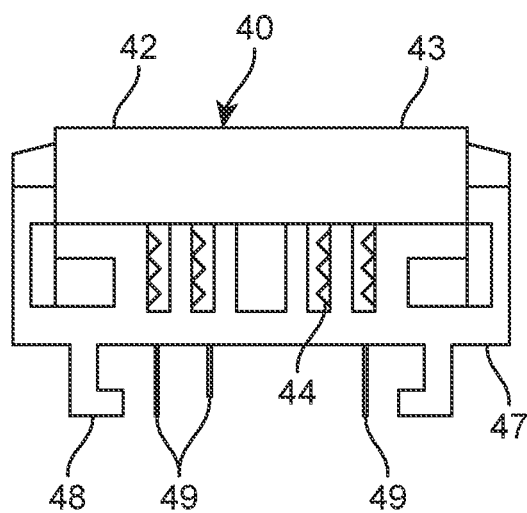
FIG. 6 illustrates a front side view of adapter assembly 40 in accordance to an embodiment of the present invention.

Adapter 42 further includes a bottom end 47 which may be observed in FIGS. 5 and 6 of the provided drawings. It can be observed that bottom end 47 includes a slot portion 48. In the present embodiment, slot portion 48 engages with a top end of battery 24 as is observed in FIG. 2. Slot portion 48 may protrude downwardly from bottom end 47 and form a latching structure which cooperates with the top end of battery 24. The present embodiment, slot portion 48 is provided as a right-angle structure that engages with battery 24. It should be understood that the shape of slot portion 48 may vary depending on the battery 24 that is implemented into the present system 10. Furthermore, bottom end 47 includes bottom electrical connections 48 which form an electrical connection with battery 24 when mounted thereon. Bottom electrical connections 48 are provided as metallic structures which protrude downwardly from bottom end 47. As observed in FIG. 6, bottom electrical connections 48 extend inwardly within the adapter 42 and are in electrical communication with top electrical connections 44. In the present embodiment, as observed in FIG. 2, adapter assembly 40 is mounted between a power tool 22 and a battery 24. When inserted therebetween, the electrical power from battery 24 is then transferred to power tool 22.

Figure 7:
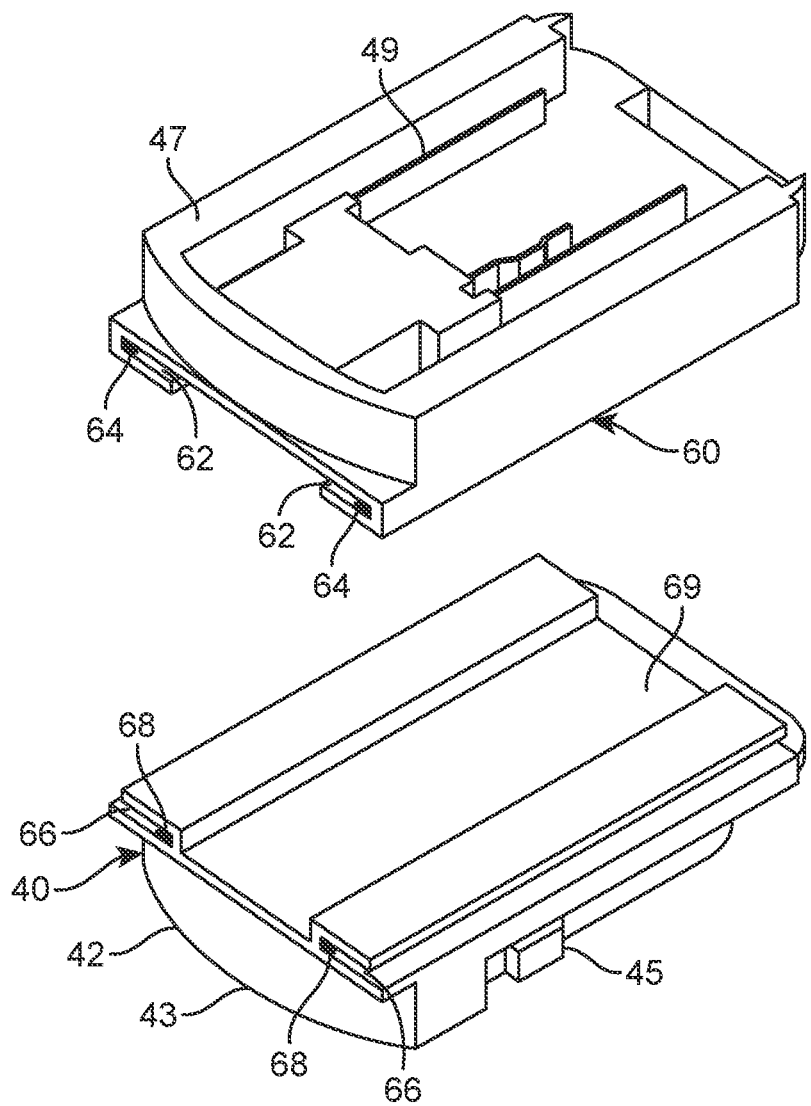
FIG. 7 represents an isometric view of connection assembly 60 in accordance to an embodiment of the present invention. This figure depicts adapter 42 having been separated into two structures which are communicably joined by channel portions on the top and bottom ends of the adapter.

Connection assembly 60 includes top channel portions 62 located on a bottom end of a first portion of the adapter and a bottom channel portions 66 which are located on a top end of a second portion of the adapter. The connection assembly 60 is properly depicted in FIG. 7 of the drawings. In can be observed that the channel portions 62 are located along opposing inner sides of the top portion of the adapter. In one embodiment, the channels of the top channel portion each have a rectangular shape. Additionally, along the inner end of the top channel portions are top electrical connections 64 which face inwardly. Furthermore, it can be observed that bottom channel portions 66 are located along opposing outer sides of the bottom portion of the adapter. The channels of the bottom channel portions 66 each include bottom electrical connections 68 which are exposed along the outer sides of the bottom portion. In the present embodiment, to form an electrical connection, the top portion and the bottom portion are slidably mounted to one another to create adapter 42. This allows a user to selectively choose different portions with different components for battery mounts and power tool mounts for use. In one embodiment, the bottom portion further includes a recess 69 which is used to aid a user in slidably mounting and unmounting the two portions of the adapter.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A battery pack adapter system, comprising:
   a) a power tool assembly including a power tool having a battery receiving section and a battery;
   b) an adapter assembly including an adapter having an adapter having a top end and a bottom end, wherein said top end includes top electrical connectors which are nested within a center portion of said top end, wherein said top end is received by said battery receiving section of said power tool, wherein said bottom end includes bottom electrical connectors which extend downwardly from said bottom end, wherein said top and bottom electrical connectors are metallic structures which extend within said adapter and are in electrical communication with each other; and
   c) a connector assembly including top channel portions located along inwardly opposing sides of a top portion of said adapter, said top channel portions further including top electrical connections, wherein said connector assembly further includes bottom channel portions exposed outwardly along opposing sides of a bottom portion of said adapter, said bottom channel portions further including bottom electrical connections.

2. The battery pack adapter system of claim 1 wherein said power tool is a drill.

3. The battery pack adapter system of claim 1 wherein said battery has a voltage between 12 and 20 volts.

4. The battery pack adapter system of claim 1 wherein said center portion protrudes outwardly from said top end.

5. The battery pack adapter system of claim 1 wherein said adapter is rectangular in shape.

6. The battery pack adapter system of claim 1 wherein said top end includes latches which lock within said battery receiving section of said power tool.

7. The battery pack adapter system of claim 6 wherein said top end further includes buttons which release said latches when engaged to release said adapter from said battery receiving section.

8. The battery pack adapter system of claim 1 wherein said bottom end further includes slot portions which are mounted to said battery.

9. The battery pack adapter system of claim 8 wherein said slot portions are right angle slot portions.

10. A battery pack adapter system, consisting of:
a) a power tool assembly including a drill having a battery receiving section and a battery having a voltage between 12 and 20 volts;
b) an adapter assembly including an adapter having a top end and a bottom end, wherein said top end includes top electrical connectors which are nested within a center portion of said top end, said top end further including latches protruding outwardly from side ends of said center portions, said latches configured to lock within said battery receiving portion of said drill, wherein said top end further includes buttons located on a back portion of said top end, wherein said buttons are release buttons witch release said latches, said bottom end including bottom electrical connectors protruding downwardly from said bottom end, wherein said bottom electrical connectors and said top electrical connectors extend within said adapter and are in electrical communication with each other, wherein said bottom end further includes right-angle slot portion which are configured to engage with said battery; and
c) a connector assembly including top channel portions located along inwardly opposing sides of a bottom side of a top portion of said adapter, said top channel portions further including top electrical connections, wherein said connector assembly further includes bottom channel portions exposed outwardly along opposing sides of a top side of a bottom portion of said adapter, said bottom channel portions further including bottom electrical connections.

\* \* \* \* \*